United States Patent
Ford et al.

(10) Patent No.: US 8,335,917 B2
(45) Date of Patent: Dec. 18, 2012

(54) SYSTEM FOR BINDING A DEVICE TO A GATEWAY TO REGULATE SERVICE THEFT THROUGH CLONING

(75) Inventors: Alan Ford, New South Wales (AU); Steve Lee, San Jose, CA (US); Jamie Zabala, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 759 days.

(21) Appl. No.: 12/190,548

(22) Filed: Aug. 12, 2008

(65) Prior Publication Data
US 2010/0040055 A1    Feb. 18, 2010

(51) Int. Cl.
    H04L 29/06    (2006.01)
(52) U.S. Cl. .................................. 713/153; 713/161
(58) Field of Classification Search .............. 713/151, 713/152, 153, 160, 161, 187; 726/12, 28, 726/29, 30, 32; 380/201
See application file for complete search history.

(56) References Cited

U.S. PATENT DOCUMENTS

| | | | |
|---|---|---|---|
| 5,856,974 A | 1/1999 | Gervais et al. |
| 5,862,451 A | 1/1999 | Grau et al. |
| 6,018,767 A | 1/2000 | Fijolek et al. |
| 6,023,464 A | 2/2000 | Woundy |
| 6,070,187 A | 5/2000 | Subramaniam et al. |
| 6,233,687 B1 | 5/2001 | White |
| 6,510,162 B1 | 1/2003 | Fijolek et al. |
| 6,598,057 B1 | 7/2003 | Synnestvedt et al. |
| 6,636,971 B1 | 10/2003 | Loukianov |
| 6,657,991 B1 | 12/2003 | Akgun et al. |
| 6,715,075 B1 | 3/2004 | Loukianov |
| 6,742,187 B1 | 5/2004 | Vogel |
| 6,754,622 B1 | 6/2004 | Beser et al. |
| 6,802,032 B1 | 10/2004 | Budinger et al. |
| 6,803,032 B2 | 10/2004 | Budinger et al. |
| 6,839,829 B1 | 1/2005 | Daruwalla et al. |
| 6,857,009 B1 | 2/2005 | Ferreria et al. |
| 6,859,826 B2 | 2/2005 | Bahlmann |
| 6,917,591 B2 | 7/2005 | St. John |
| 6,986,157 B1 | 1/2006 | Fijolek et al. |

(Continued)

FOREIGN PATENT DOCUMENTS

EP      1848150      10/2007

OTHER PUBLICATIONS

Cablelabs, Data-Over-Cable Service Interface Specifications DOCSIS 3.0 Security Specification, c. 2006-2007, Cable Television Laboratories, Inc., http://cablemodem.com/specifications/specifications30.html.

(Continued)

*Primary Examiner* — Gilberto Barron, Jr.
*Assistant Examiner* — Izunna Okeke
(74) *Attorney, Agent, or Firm* — Leon R. Turkevich

(57) ABSTRACT

In one example, a Cable Modem Termination System (CMTS) combines a value identifying itself with a cable modem Media Access Control (MAC) address stored in a provisioning request. The CMTS then relays the modified provisioning request to a provisioning server, which analyzes the value to identify a CMTS associated with the cable modem MAC address. Then, to regulate cable modem cloning or for other reasons, the provisioning server selects provisioning information for the cable modem according to the identified CMTS-MAC address association.

21 Claims, 3 Drawing Sheets

U.S. PATENT DOCUMENTS

| | | |
|---|---|---|
| 7,058,007 B1 | 6/2006 | Daruwalla et al. |
| 7,080,400 B1 | 7/2006 | Navar |
| 7,114,070 B1 | 9/2006 | Willming et al. |
| 7,152,117 B1 | 12/2006 | Stapp et al. |
| 7,227,889 B1 | 6/2007 | Roeck et al. |
| 7,272,846 B2 | 9/2007 | Williams et al. |
| 7,293,078 B2 | 11/2007 | Danforth |
| 7,293,282 B2 | 11/2007 | Danforth et al. |
| 7,305,460 B2 | 12/2007 | Park |
| 7,334,252 B1 | 2/2008 | Millet et al. |
| 7,334,258 B1 | 2/2008 | Ford et al. |
| 7,512,969 B2 | 3/2009 | Gould et al. |
| 7,539,193 B2 | 5/2009 | Pfeffer et al. |
| 7,558,845 B2 | 7/2009 | Finley et al. |
| 7,600,003 B1 | 10/2009 | Okimianski et al. |
| 7,606,870 B2 | 10/2009 | Higgs |
| 7,640,340 B1 | 12/2009 | Stapp et al. |
| 7,701,956 B2 | 4/2010 | Howe |
| 7,716,468 B2 | 5/2010 | Millet et al. |
| 7,991,863 B2 | 8/2011 | Zhao |
| 2001/0032311 A1 | 10/2001 | White |
| 2002/0066110 A1 | 5/2002 | Cloonan et al. |
| 2002/0101883 A1 | 8/2002 | Ruszczyk et al. |
| 2002/0178289 A1 | 11/2002 | Kurose |
| 2003/0070063 A1 | 4/2003 | Boyle et al. |
| 2004/0123329 A1* | 6/2004 | Williams et al. ............. 725/111 |
| 2005/0005154 A1 | 1/2005 | Danforth et al. |
| 2005/0015810 A1 | 1/2005 | Gould et al. |
| 2005/0132360 A1 | 6/2005 | Chu et al. |
| 2005/0286518 A1 | 12/2005 | Park et al. |
| 2006/0031394 A1 | 2/2006 | Tazuma |
| 2006/0080537 A1 | 4/2006 | Yoshizaki |
| 2006/0140164 A1 | 6/2006 | Patel et al. |
| 2006/0159100 A1 | 7/2006 | Droms et al. |
| 2006/0195611 A1 | 8/2006 | Howe |
| 2006/0206594 A1 | 9/2006 | Brown et al. |
| 2007/0061458 A1 | 3/2007 | Lum |
| 2007/0208932 A1 | 9/2007 | Millet et al. |
| 2007/0276943 A1 | 11/2007 | Marez et al. |
| 2008/0109864 A1 | 5/2008 | Danforth et al. |
| 2008/0126540 A1 | 5/2008 | Zeng et al. |
| 2008/0177998 A1 | 7/2008 | Apsangi et al. |
| 2008/0225749 A1 | 9/2008 | Peng et al. |
| 2009/0070800 A1 | 3/2009 | Gould et al. |
| 2009/0083406 A1 | 3/2009 | Harrington et al. |
| 2009/0193129 A1 | 7/2009 | Agarwal et al. |
| 2009/0198804 A1 | 8/2009 | Danforth et al. |
| 2009/0213871 A1 | 8/2009 | Carlson et al. |
| 2009/0282134 A1 | 11/2009 | Walston et al. |
| 2010/0040055 A1 | 2/2010 | Ford et al. |

OTHER PUBLICATIONS

Stolowitz Ford Cowger LLP, Listing of Related Cases, Nov. 2, 2010.

* cited by examiner

SYSTEM FOR BINDING A DEVICE TO A GATEWAY TO REGULATE SERVICE THEFT THROUGH CLONING

TECHNICAL FIELD

The present disclosure relates generally to the field of cable networks.

BACKGROUND

Cable operators have widely deployed high-speed data services on cable television systems. These data services allow subscriber-side devices, such as personal computers, to communicate over an ordinary cable TV network Hybrid Fiber Coax (HFC) cable through a cable modem. The cable modem communicates with a Cable Modem Termination System (CMTS), which connects the cable TV network to a data network, such as the Internet.

The cable operators have recently been plagued by service theft through cable modem cloning. Cable modem cloning works by having one party sign up for a cable modem Internet Service legitimately, and then having another party "clone" or copy that cable modem and it's identifying data. This theft can be difficult to prevent, particularly when the cloned modem connects to a different CMTS than the original modem. The disclosure that follows solves this and other problems.

DESCRIPTION OF EXAMPLE EMBODIMENTS

Overview

In one example, a Cable Modem Termination System (CMTS) combines a value identifying itself with a cable modem Media Access Control (MAC) address stored in a provisioning request. The CMTS then relays the modified provisioning request to a provisioning server, which analyzes the value to identify a CMTS associated with the cable modem MAC address. Then, to regulate cable modem cloning or for other reasons, the provisioning server selects provisioning information for the cable modem according to the identified CMTS-MAC address association.

Description

Several preferred examples of the present application will now be described with reference to the accompanying drawings. Various other examples of the invention are also possible and practical. This application may be exemplified in many different forms and should not be construed as being limited to the examples set forth herein.

Figure 1:
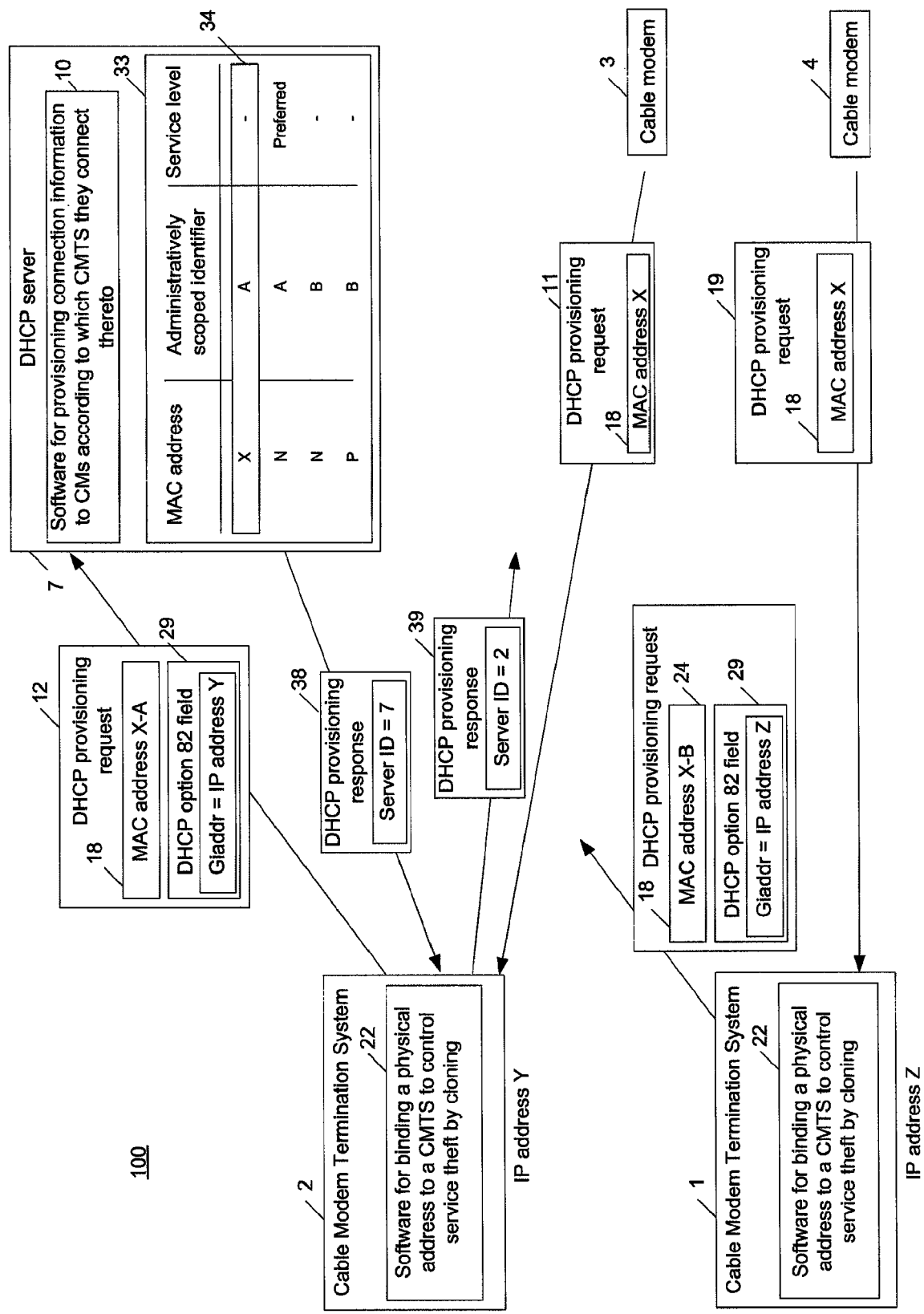
FIG. 1 illustrates an example system for binding cable modems to Cable Modem Termination Systems (CMTSs) to regulate service theft through cloning.

FIG. 1 illustrates an example system for binding cable modems to Cable Modem Termination Systems (CMTSs) to regulate service theft through cloning.

The system 100 includes CMTSs 1-2 and a provisioning server 7, which have the software 22 or 10 respectively configured thereon. The software 10 maintains a table 33 associating cable modem Media Access Control (MAC) addresses to administratively scoped identifiers corresponding to the CMTSs 1 and 2. The CMTSs 1 and 2 modify MAC addresses included in provisioning messages based on their respective administratively scoped identifier before relaying these modified provisioning messages. When the modified provisioning requests are received at the server 7, the software 10 provisions the requesting cable modem according to a comparison of the MAC address and CMTS identifier combination in the modified message to the table 33. The principles described above are best illustrated through the example included in the following paragraphs.

By way of background on cable networks, it should be understood that an initial step in bringing a cable modem online is for the cable modem to request provisioning information from a Dynamic Host Configuration Protocol (DHCP) server or other provisioning server. The provisioning information contains a physical address for the cable modem and other information needed by the cable modem to complete ranging. In a typical cable network, the CMTS for the cable modem operates as a relay agent for provisioning requests from the cable modem.

For example, in the system 100 an initializing cable modem 3 broadcasts a DHCP provisioning request 11. The request 11 contains the Media Access Control (MAC) address X for the cable modem 3. Specifically, this MAC address X is contained in a client hardware address ("chaddr") field 18 of the broadcast DHCP discovery 11. The CMTS 2, configured as a relay agent, receives the broadcast request 11.

Before relaying, the software 22 modifies the MAC address X according to an administratively scoped identifier A corresponding to the CMTS 1. In the present example, the MAC address X is appended with the identifier A, which is a four byte value. Accordingly, the six octet MAC address X is extended to eight octets with the appended identifier A. It should be understood that attaching this modifier replaces an actual, reachable MAC address X for the cable modem 3 in the request 11 with the MAC address X-A, which may be an unreachable address. The identifier can be any administratively scoped identifier associated with the CMTS 2, including a value corresponding to the IP address Y of the CMTS 2, which is contained within the gateway address "giaddr" subfield of the DHCP option 82 field 29.

It should be understood that the identifier A can be attached to the MAC address X in any manner, and that identifier A can be of varying size. For example, the identifier A may be a 2, 4 or 6 byte value, and can be pre-pended, appended, or even hashed with the MAC address according to a hashing scheme known to software 10 and 22. The resulting value is not necessarily a reachable address. For example, if the MAC address X is equal to "000c.0102.0102", and the identifier A is equal to "aabb", then the resulting value is "000c.0102.0102.aabb". The software 22 stores this resulting value "000c.0102.0102.aabb" in the MAC address field independently of whether the software 22 has knowledge that his value is a reachable address. Typically, the resulting value is an unreachable address, at least for devices located along the path for exchanging the provisioning information.

One property of the DHCP protocol is compatibility with eight and ten bit address values in the field 18. Due in part to this property of DHCP, and for other reasons, many existing network devices such as DHCP servers are configured for compatibility with both six octet and eight octet MAC addresses (or even ten octet, or more, MAC addresses). Accordingly, it should be understood the system 100 leverages this property of DHCP, and the compatibility of existing network devices with eight octet MAC addresses, to add the administratively scoped identifier A into the relayed request 12 without modifying the DHCP protocol to add a new field. Avoiding addition of a new field for the administratively scoped identifier A, or otherwise modifying the DHCP protocol to accommodate the administratively scoped identifier A, simplifies implementation of the system 100 into existing networks.

It should be apparent that the software 22 modifies the address contained in the chaddr field 18, not in an addressing header. Also, the software 22 modifies the addresses contained in provisioning requests—not all traffic. Accordingly, for these and other reasons, changing the address from the actual physical address for the cable modem 3 to a different potentially unreachable address in this manner does not create addressing errors in the cable network.

The MAC address X-A can be contained in the chaddr field 18 as illustrated in FIG. 1. Alternatively, the modified MAC address X-A can be contained in a subfield of the option 82 field 29, which is added to the request 11 by the CMTS 2 to form the request 12. This subfield is a subfield designated for the relay agent to identify a cable modem associated with the provisioning request.

Thereafter, the CMTS relays the provisioning request 12 to the provisioning server 7. The software 10 analyzes the client hardware address field 18 for the MAC address X-A. According to a predefined scheme, the software 10 identifies the MAC address X and the identifier A for comparison with the table 33.

The table 33 is formatted by the software 10 according to subscribers requesting service. When a subscriber initially seeks service, the subscriber generally contacts the service provider to configure service. Based on the subscriber's location, the service provider can at that time identify a CMTS to be bound to the physical address of the cable modem to be used by the subscriber. For example, when the subscriber for cable modem 3 contacted the service provider, the entry 34 was added to the table 33 based on information provided by the subscriber. Accordingly, it should be understood that, in this example, the entry 34 existed in the table prior to the server 7 receiving the request 12.

The software 10 compares the identified MAC address X and identifier A to the table 34. Due to the identified combination X-A matching an existing table entry 34, the software 10 observes that the provisioning request 12 indicates a valid CMTS-MAC address combination. The server 7 provides provisioning information based on the valid CMTS-MAC address combination.

The server 7 responds differently to a request for an invalid CMTS-MAC address combination. For example, when the cable modem 4 on the CMTS 1 sends the request 19 containing the MAC address X, the corresponding request 12 is relayed to the provisioning server. The MAC address X-B contained in the chaddr field 18 is not represented in the table 33. Accordingly, the server 7 can send out different configuration information, such as a disabled configuration file, in response to the request 24. Accordingly, the cable modem 4 does not receive service, or receives a different level of service, than the cable modem 3, which regulates service theft by the user of cable modem 4.

Referring back to the message exchange associated with the valid CMTS-MAC address combination, the cable modem 3 receives back the provisioning information and comes online. Subsequently, the cable modem 3 may attempt a DHCP renewal. This renewal should be sent through the CMTS 2 so that the server 7 receives a renewal request from the MAC address X-A, which represents a valid combination as discussed previously. If the renewal request is sent directly to the server 7, the server 7 observes the MAC address X, which does not represent a valid combination.

To ensure that these renewals are directed through the CMTS 2, the software 22 modifies the provisioning response 38 for the initial provisioning request 12. Specifically, the response 38 contains a "server-id" field containing addressing information corresponding to the server 7. The software 22 changes the value in this field to correspond to the CMTS 2 in the relayed response 39, which masks the identity of the server 7 causing subsequent DHCP renewals for the cable modem 3 to be sent to the CMTS 2 for relay to the server 7. This is also beneficial for further securing the cable network by preventing cable modems 3 and 4 from obtaining direct access to the provisioning server 7. The process described in this paragraph and the previous paragraph is an optional process for the system 100.

It should be understood that the principles described above can be applied for other reasons besides regulating service theft through cable modem cloning. For example, to vary service level according to which CMTS a cable modem has connected to, the table 34 includes two entries for the MAC address N. Referring to the table 34, if a provisioning request for MAC address N includes the identifier A, the information in the corresponding provisioning response provides the cable modem with a preferred customer service level. In contrast, a standard service level is provisioned if the provisioning request for the MAC address N includes the identifier B. Accordingly, the user is permitted to move the cable modem within a subset of CMTSs, but a preferred location within that subset receives better service than another location in that subset. In this example, it is still possible to disable service completely for provisioning requests that do not include either of the identifiers A or B, namely for locations outside that subset of CMTSs.

The example system 100 described above binds a MAC address to only one CMTS. However, it should be understood that the principles described above can also be used to bind a MAC address to a groups of CMTSs, which would allow a cable modem to move within the group as discussed previously. Also, the principles described above can be used to bind a MAC address to a particular packet fiber node of a CMTS.

The system 100 described above can be used to prevents a clone on a different CMTS than the original. A clone on a different CMTS than its original can also be detected using the principles described in U.S. patent application Ser. No. 12/190,527, entitled "INTER-GATEWAY CLONED DEVICE DETECTOR USING PROVISIONING REQUEST ANALYSIS", which is herein incorporated by reference in its entirety. A clone can be detected when connecting to the same CMTS as its original using the principles described in U.S. patent application Ser. No. 11/373,807, which is herein incorporated by reference in its entirety.

The system 100 described above is operable with a wide variety of cable modems and CMTSs. For example, the system 100 described above is operable with both DOCSIS 1.0 modems, as well as DOCSIS 1.1 and greater versions, because the system 100 operates independently of whether the cable modem is configured with Baseline Privacy Interface Plus (BPI+). This is an advantage over detection schemes reliant on BPI+, which can possibly be circumvented by cloning older cable modems.

It should be understood that the principles described above can be used to control any provisioned attribute. The principles described above are not limited to controlling the amount of bandwidth provisioned to a requesting cable modem.

Figure 2:
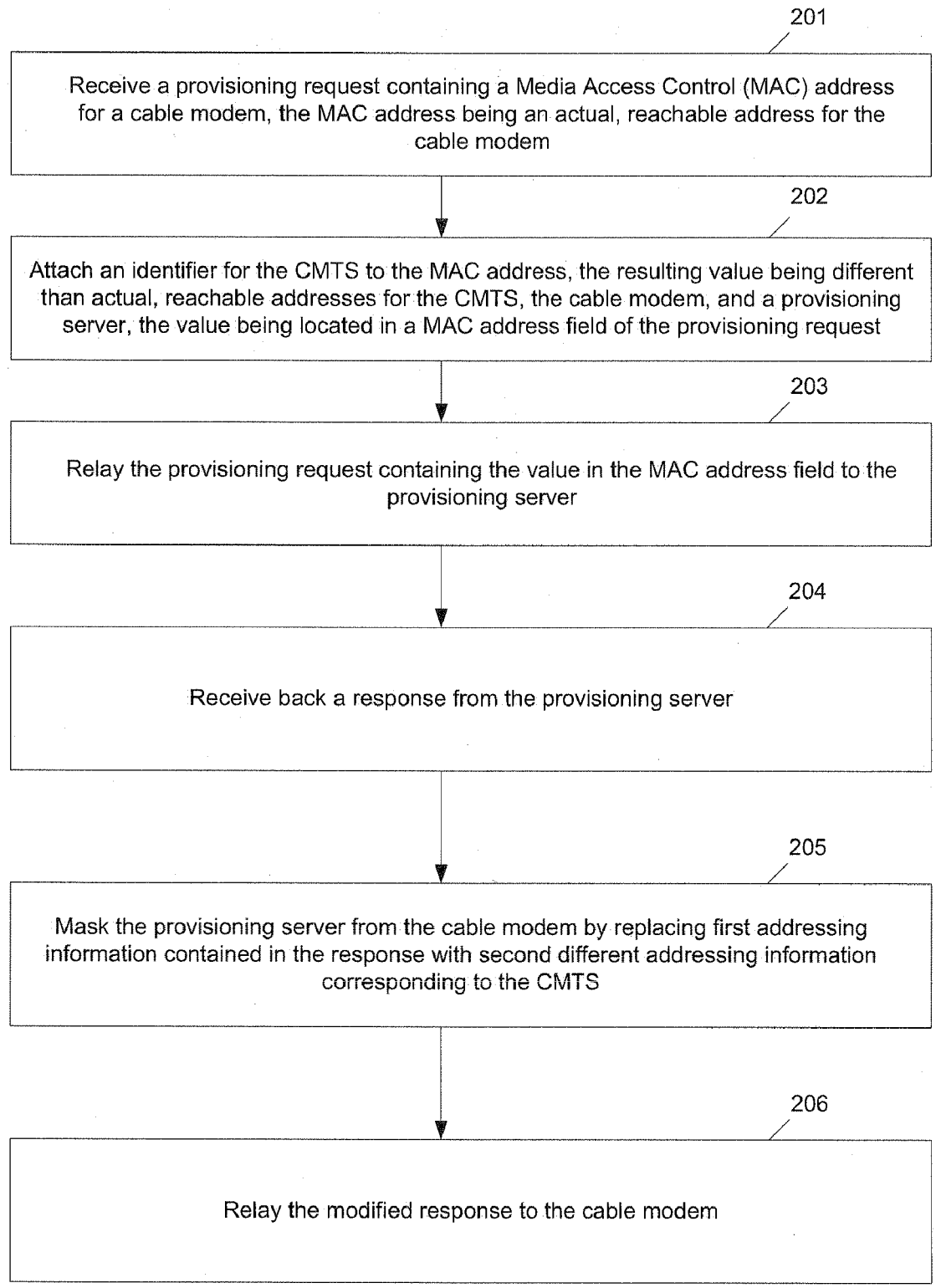
FIG. 2 illustrates an example method for using the CMTSs illustrated in FIG. 1.

FIG. 2 illustrates an example method for using the CMTSs illustrated in FIG. 1.

In block 201, the CMTS receives a provisioning request containing a Media Access Control (MAC) address for a cable modem, the MAC address being an actual, reachable address for the cable modem. In block 202, the CMTS attaches an identifier for the CMTS to the MAC address, the resulting value being different than actual, reachable addresses for the CMTS, the cable modem, and a provisioning server, the value being located in a MAC address field of the provisioning request. In block 203, the CMTS relays the provisioning request containing the value in the MAC address field to the provisioning server.

In block 204, the CMTS receives back a response from the provisioning server. In block 205, the CMTS masks the provisioning server from the cable modem by replacing first addressing information containing in the response with second different addressing information corresponding to the CMTS. The CMTS also replaces the MAC address field of the DHCP provisioning response with the real, reachable MAC address of the cable modem. In block 206, the CMTS relays the modified response to the cable modem.

Figure 3:
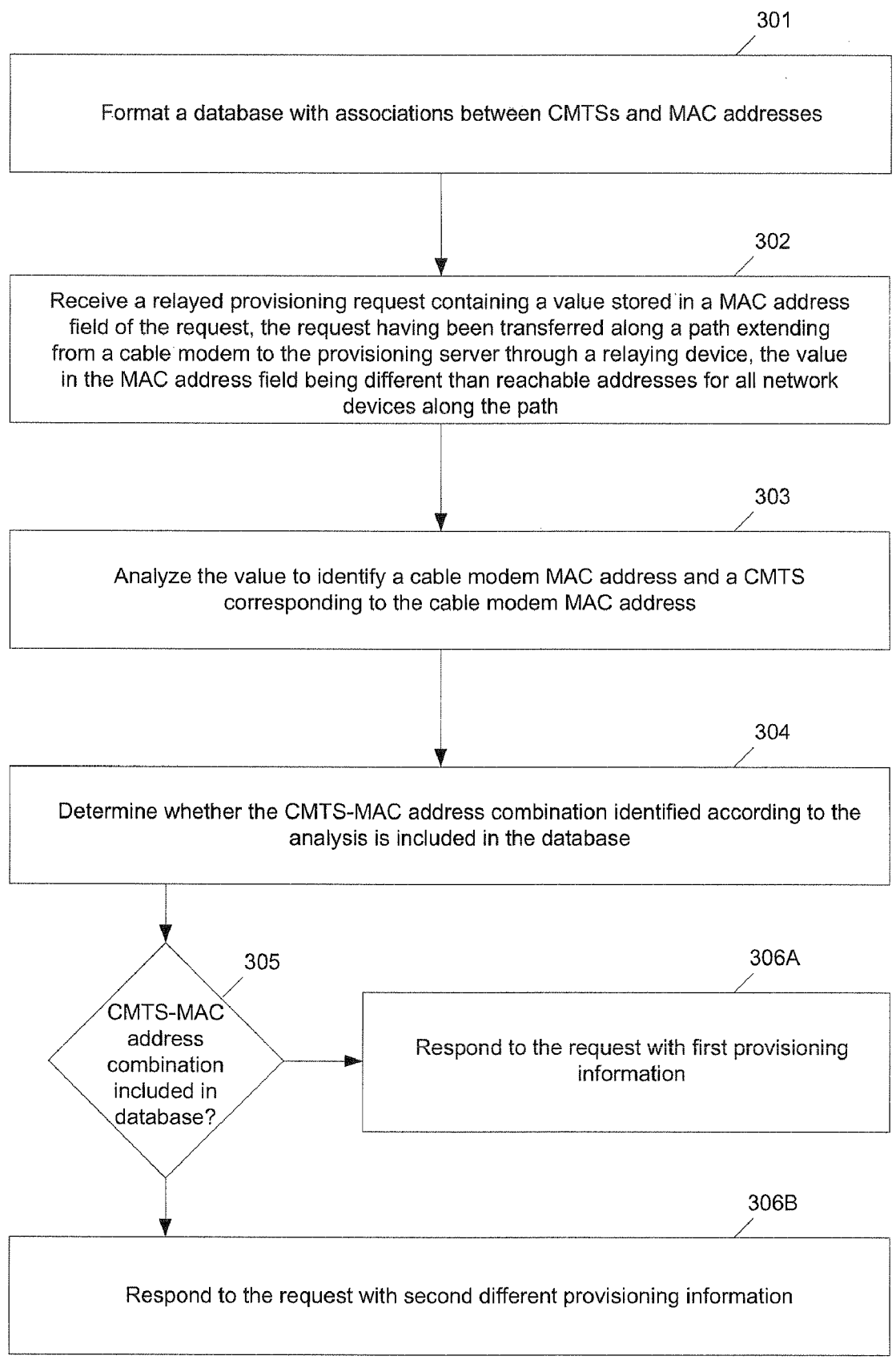
FIG. 3 illustrates an example method for using the provisioning server illustrated in FIG. 1.

FIG. 3 illustrates an example method for using the provisioning server illustrated in FIG. 1.

In block 301, the server formats a database with associations between CMTSs and MAC addresses. In block 302, the server receives a relayed provisioning request containing a value stored in a MAC address field of the request, the request having been transferred along a path extending from a cable modem to the provisioning server and through a relaying device. The value in the MAC address field is different than reachable addresses for all network devices along the path because the value is a combination of the cable modem's MAC address and an identifier for the CMTS.

In block 303, the server analyzes the value to identify a cable modem MAC address and a CMTS corresponding to the cable modem MAC address. In block 304, the server determines whether the CMTS-MAC address combination identified according to the analysis is included in the database.

If the CMTS-MAC address combination is included in the database in decision box 305, then in block 306A the server responds to the request with first provisioning information. Otherwise, in block 306B the server responds to the request with second different provisioning information.

Several examples have been described above with reference to the accompanying drawings. Various other examples of the invention are also possible and practical. The system may be exemplified in many different forms and should not be construed as being limited to the examples set forth above.

For example, the principles described above are not limited to cable networks and can be applied to any router or other provisioning relay agent. As one alternative example, a router associated with an Internet Protocol (IP) phone can modify an address contained in a provisioning request (a DHCP provisioning request or other type of provisioning request) before relaying the modified provisioning request to a provisioning server. Thereafter, the provisioning server can select provisioning information according to the modified address.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A system, comprising:
a Cable Modem Termination System (CMTS) configured to:
receive a provisioning request for a cable modem, the provisioning request containing a first field for a physical address of the cable modem, wherein the first field contains a six octet value;
obtain an identifier that is different than an IP address of the CMTS;
attach the obtained identifier to the six octet value within the first field, wherein said obtained identifier is inserted into the first field via said attachment, and wherein a greater than six octet value is contained in the first field after the attachment; and
relay the provisioning request containing the greater than six octet value to the provisioning server.

2. A system, comprising:
a Cable Modem Termination System configured to:
receive a provisioning request containing a six octet value corresponding to a Media Access Control (MAC) address for a cable modem, the six octet value being an actual, reachable address for the cable modem;
obtain an identifier that is different than an IP address of the CMTS;
attach the obtained identifier to the six octet value to generate a greater than six octet value, wherein the generated greater than six octet value is different than the actual, reachable address for the cable modem; and
relay the provisioning request containing the greater than six octet value to a provisioning server.

3. The system of claim 1, wherein the six octet value comprises an actual, reachable address for the cable modem, wherein the actual, reachable address for the cable modem is a Media Access Control (MAC) address for the cable modem.

4. A method, comprising:
receiving a provisioning request at an access router;
providing an identifier that is different than an IP address of the CMTS;
combining the provided identifier corresponding to the access router with a six octet value contained in the received provisioning request to generate a greater than six octet value; and
relaying the provisioning request having the greater than six octet value over a network and to a provisioning device;
wherein the greater than six octet value is located in a field designated by a provisioning protocol for identifying a requestor address, and wherein the greater than six octet value located in said field comprises a non-address.

5. The method of claim 4, wherein the six octet value comprises a physical address.

6. The system of claim 3 wherein the CMTS is further configured to:
in addition to attaching the obtained identifier to the six octet value within the first field, insert an address for the CMTS into a second different field of the provisioning request prior to relaying the provisioning request.

7. The system of claim 2, wherein the provisioning server contains circuitry configured to:
receive the relayed provisioning request and observe the greater than six octet value contained therein;
compare information represented by the greater than six octet value to a table that indicates valid access routers for different cable modem physical addresses; and
respond back to the CMTS with provisioning information, wherein the provisioning information included in the response is selected according to the comparison.

8. The system of claim 7, wherein the provisioning information included with the response is configured to prevent the cable modem from completing ranging.

9. The system of claim 7, wherein the provisioning information included with the response is configured to bring the cable modem online if the greater than six octet value identifies a valid CMTS-MAC address combination.

10. The system of claim 2, wherein the CMTS is further configured to:
receive back a response to the provisioning request from the provisioning server; and
replace addressing information contained in the response with addressing information for the CMTS to mask the provisioning server from the cable modem.

11. A system, comprising:
a Cable Modem Termination System (CMTS) comprising circuitry configured to:
receive from a cable modem a broadcast Dynamic Host Control Protocol (DHCP) discover containing a six octet value in a client hardware field thereof, wherein the six octet value comprises an actual, reachable address of the cable modem;
obtain an identifier that is different than an IP address of the CMTS;
attach the obtained identifier to the six octet value to generate a greater than six octet value, wherein the greater than six octet value is not an actual, reachable address of the cable modem;
relay the broadcast Dynamic Host Control Protocol (DHCP) discover containing the greater than six octet value in the client hardware field thereof to the provisioning server.

12. An apparatus, comprising:
a processing device; and
a memory storing instructions that, if executed by the processing device, are operable to perform operations comprising:
receiving a provisioning request at an access router;
obtaining an identifier that is different than an IP address of the access router;
combining the obtained identifier with a six octet value contained in the received provisioning request to generate a greater than six octet value; and
relaying the provisioning request having the greater than six octet value over a network and to a provisioning device;
wherein the greater than six octet value is located in a field designated by a provisioning protocol for identifying a requestor address, and wherein the greater than six octet value located in said field comprises a non-address.

13. The apparatus of claim 12, wherein the obtained identifier is appended to the six octet value.

14. The method of claim 5, further comprising:
receiving a response to the provisioning request, the response including information identifying an address for the provisioning device;
modifying the information in the response to mask the address for the provisioning device; and
relaying the response having the modified information to the device connected to the access router.

15. The method of claim 5, further comprising:
generating a table associating physical addresses with access routers;
comparing information represented by the greater than six octet value included in the relayed provisioning request to the generated table; and
determining whether the device requesting provisioning is associated with cable modem cloning according to the comparison.

16. The method of claim 5, further comprising:
comparing information represented by the greater than six octet value to stored associations of physical addresses to access routers; and
controlling an amount of bandwidth provided to a device connected to the access router according to the comparison.

17. The system of claim 2, wherein said attaching further comprises inserting the obtained identifier into a client hardware field of a Dynamic Host Control Protocol (DHCP) discover.

18. The system of claim 2, wherein the attaching further comprises hashing the obtained identifier with the six octet value, wherein the provisioning request comprises a DHCP discover, and wherein a result of the hashing is located in a client hardware field of the DHCP discover.

19. The system of claim 2, wherein the attaching further comprises prepending the obtained identifier to the six octet value, wherein the provisioning request comprises a DHCP discover, and wherein a result of the prepending is located in a client hardware field of the DHCP discover.

20. The system of claim 2, wherein the attaching further comprises appending the obtained identifier to the six octet value, wherein the provisioning request comprises a DHCP discover, and wherein a result of the appending is located in a client hardware field of the DHCP discover.

21. The apparatus of claim 12, wherein the six octet value comprises a physical address.

* * * * *

UNITED STATES PATENT AND TRADEMARK OFFICE
CERTIFICATE OF CORRECTION

| | | |
|---|---|---|
| PATENT NO. | : 8,335,917 B2 | Page 1 of 1 |
| APPLICATION NO. | : 12/190548 | |
| DATED | : December 18, 2012 | |
| INVENTOR(S) | : Alan Ford et al. | |

It is certified that error appears in the above-identified patent and that said Letters Patent is hereby corrected as shown below:

On the title page, item (75) Inventors: please delete "Jamie" and insert --Jaime-- therefor.

Signed and Sealed this
Third Day of March, 2015

Michelle K. Lee
*Deputy Director of the United States Patent and Trademark Office*